DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 22

T881,007

FRACTURED FILM PRODUCT

August K. Meyer, Box 495, Kingsport, Tenn. 37662

Continuation-in-part of application Ser. No. 673,272, Oct. 6, 1967. This application May 12, 1970, Ser. No. 36,671

Int. Cl. B32b *3/10*

U.S. Cl. 161—109

No Drawing. 14 Pages Specification

A polymeric film containing up to about 15% polyester or copolyester resulting in an increase in tenacity of the end product after the film is drafted to produce orientation and fractured by applying shear forces thereto. Some examples of the polyesters and copolyesters are: Poly(ethylene terephthalate); poly(tetramethylene terepththalate); copolyesters such as those made by a condensation reaction between cyclohexanedimethanol and a dimethyl ester made from isophthalic and terephthalic acid; and copolyesters such as those made by a condensation reaction between a dimethyl ester of terephthalic acid, cyclohexanedimethanol and ethylene glycol.